(No Model.)

J. J. JOHNSTON.
BUTTER VESSEL.

No. 265,612. Patented Oct. 10, 1882.

WITNESSES
Fred. G. Dieterich
Jno. H. Hockett

INVENTOR
James J. Johnston

United States Patent Office.

JAMES J. JOHNSTON, OF COLUMBIANA, OHIO, ASSIGNOR TO THE UNITED STATES IMPROVEMENT COMPANY, (LIMITED,) OF SAME PLACE.

BUTTER-VESSEL.

SPECIFICATION forming part of Letters Patent No. 265,612, dated October 10, 1882.

Application filed February 11, 1882. (No model.)

*To all whom it may concern:*

Be it known that I, JAMES J. JOHNSTON, of Columbiana, in the county of Columbiana and State of Ohio, have invented a certain new and useful Improvement in Butter-Vessels; and I do hereby declare that the following is a full, clear, and exact description thereof, reference being had to the accompanying drawings, and to the letters of reference marked thereon.

My invention relates to an improvement in butter-vessels; and it consists in providing the vessel with a grooved projection and its lid with a flange resting on the bottom of said groove, said flange corresponding in form and contour to the form and contour of the groove in said projection, said vessel and grooved projection each provided with a pouring-lip, and said vessel furnished with a detachable chamber for holding chloride of lime, the whole constructed, arranged, and operating as will hereinafter more fully and at large appear.

To enable others skilled in the art with which my invention is most nearly connected to make and use it, I will proceed to describe its construction and operation.

Figure 1:
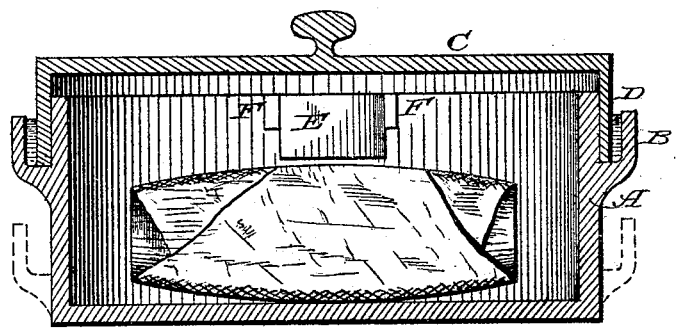
Figure 2:
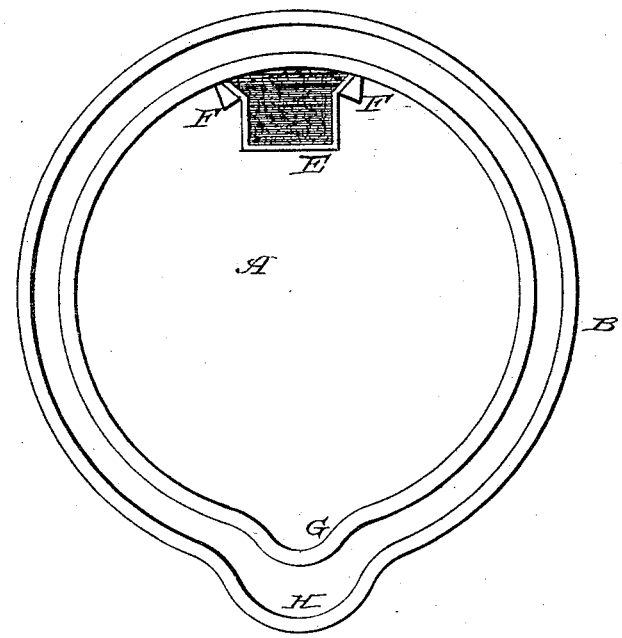

In the accompanying drawings, which form part of my specification, Figure 1 is a vertical and transverse section of my improved butter-vessel. Fig. 2 is a top view of the same with the lid removed.

Reference being had to the accompanying drawings, A represents the butter-vessel, which is furnished with a grooved projection, B, the contour and form of which are shown in Fig. 2. Said vessel and grooved projection B are furnished with pouring-lips G and H.

The vessel is also furnished with a lid, C, having a flange, D, the lower edge of which rests upon the bottom of the groove in the projection B, the form and contour of the flange corresponding to the form and contour of the groove in said projection.

The vessel A is furnished with a detachable chamber, E, which is held in the vessel and to the inner wall thereof through the medium of dovetail lugs F.

It is often desirable to place the butter-vessel in water, as in the dairy and spring-house, for the purpose of keeping said vessel and its contents cool. In that case the grooved projection should be arranged on the vessel A as indicated by the dotted lines in Fig. 1, in which case the flange D should be correspondingly increased in depth, so as to rest on the bottom of the groove of said projection.

It has been demonstrated that chloride of lime will neutralize butyric acid. This fact may be clearly proven by dissolving a small quantity of chloride of lime in water and working over rancid butter in said water, which operation, if repeated several times, will make the butter almost as sweet as when it was first made. In view of the fact that chloride of lime acts as a detersive, and as a neutralizing agent with relation to butyric acid, I place chloride of lime in the chamber E, thereby keeping it free from direct contact with the butter, and at the same time utilizing its detersive and neutralizing properties.

The operation of my improvement is as follows: The butter is placed in the vessel A and chloride of lime in the chamber E. The lid C is then placed on the vessel, as shown in Fig. 1, and the groove in the projection B filled with water, which will water-seal the vessel, and thereby exclude the air, dust, insects, and deleterious gases from contact with the butter, the advantage of which, combined with the neutralizing properties of the chloride of lime, will be apparent without further description.

Having thus described my improvement, what I claim is—

The vessel A, provided with the grooved projection B, pouring-lips G and H, and detachable chamber E, and said vessel furnished with a lid, C, having flange D, corresponding in form to the form of the groove in the projection, substantially as herein described, and for the purpose set forth.

JAMES J. JOHNSTON.

Witnesses:
A. C. JOHNSTON,
T. D. D. OURAND.